Patented Feb. 24, 1942

2,274,163

UNITED STATES PATENT OFFICE 2,274,163

LUMINESCENT MATERIAL

Ronald Puleston, London, and Stanley Thomas Henderson, Iver, England, assignors to Electric & Musical Industries Limited, Hayes, Middlesex, England, a company of Great Britain No Drawing. Application February 7, 1939, Serial No. 255,058. In Great Britain February 8, 1938

9 Claims. (Cl. 250—81)

The present invention relates to a method of rendering a powder free flowing.

In the preparation of fluorescent screens for cathode ray tubes, one method used is to spray the dry powder on to an adhesive layer of potassium silicate or other binder. In using this method, the fluorescent powder must be in such form that it will flow freely like dry sand, and not cake together like damp table salt. The usual method of ensuring that the powder will flow in the required manner is to cause the material from which the powder is formed to crystallize into particles of controllable size by heating with suitable fluxes. Another method, which may be used in addition to the first mentioned method, or which may be applied directly to an activated fluorescent powder of a "caking" nature, is to coat the particles with some comparatively inert substance, for example as described in British Patent No. 449,392. In the said patent a method of manufacturing free flowing fluorescent materials consisting of zinc sulphide, cadmium sulphide, zinc-cadmium sulphide, zinc-manganese sulphide or zinc-cadmium manganese sulphide, is disclosed consisting in coating the particles of the powder with aluminium oxide, zinc oxide or zinc oxychloride.

We have found that a readily available material not hitherto used for the purpose, namely, silica, is very suitable for use in coating the particles of fluorescent powders to render the powders free flowing. Thus, according to the invention, a method of rendering a powder free flowing is provided comprising the step of coating the particles of the powder with silica.

The method of the invention is particularly applicable in the case of those powders comprising sulphides of zinc or zinc and cadmium which have been rapidly activated without much added flux (usually ammonium chloride or other chlorides), and are consequently of a caking nature. The re-agents used in the coating process with silica are unlikely to have any deleterious effect on the fluorescent sulphides. The use of silica as a coating material has the added advantage that, on baking the screen, any excess of alkali present in the layer of potassium or other silicate arising from the method of forming the silica will be retained in combination with or due to absorption by the silica, without which the alkali would exercise its well known adverse effect on the brilliance and color of the fluorescence of the screen material. Thus, also, the known method of using a dilute solution of caustic soda or other alkali as a binder may be employed with a sulphide material treated in the manner described without damage to the luminescence on subsequent baking.

In carrying the invention into practice the fluorescent material may be taken directly after its activation, that is to say, after the heating process which develops the fluorescence, or it may be first graded by sieving, or it may be ground and treated in the form of an aqueous suspension. Further, a mixture of materials may be treated in one operation.

For example, in accordance with one embodiment of the invention, to the fluorescent powder to be rendered free flowing is added a warm dilute solution of pure potassium silicate, the powder and the solution being thoroughly stirred and first acidified with acetic acid and then made alkaline with ammonia. When the solution becomes alkaline the silica is precipitated as a thin coating on the particles of the powder which are then filtered off, well washed and thoroughly dried. The quantity of silica required to give a free flowing powder is usually about 2 to 4% of the weight of the powder treated, but may be increased up to as much as 10% in the case of a fluorescent material without excessive deterioration of the brilliance of the fluorescence obtainable from the powder, although, of course, the brilliance of the fluorescence is reduced as the silica coating on the powder grains is increased in thickness.

In addition to being applicable in the case of sulphide powders as referred to above, the method of invention may be also applied to reduce the tendency to caking in powders composed of fluorescent materials such as silicates and tungstates.

Having described our invention, what we claim is:

1. The steps of improving luminescent material, which comprise adding the luminescent material to be improved to a solution of a silicate salt, and thereafter precipitating silica out of said solution upon the added luminescent material.

2. The steps of improving luminescent material which comprise adding the luminescent material to be improved to a solution of a silicate salt, acidifying the solution, and subsequently precipitating silica upon the luminescent material by rendering the solution alkaline.

3. The steps of improving luminescent material, which comprise adding the luminescent material to be improved to a solution of a silicate salt, thereafter precipitating silica out of said solution upon the added luminescent material, filtering out the luminescent material from the solution, washing the filtered luminescent material, and subsequently drying said washed material.

4. The steps of improving luminescent material which comprise adding the luminescent material to be improved to a solution of a silicate salt, acidifying the solution, subsequently precipitating silica upon the luminescent material by rendering the solution alkaline, filtering out the luminescent material from the solution, washing the filtered luminescent material, and subsequently drying said washed material.

5. The preparation of an improved luminescent material which comprises the steps of adding particles of a luminescent material to a warm dilute solution of potassium silicate, acidifying the solution with acetic acid, precipitating a thin coating of silica on the particles of said luminescent material by rendering the solution alkaline with ammonia, filtering out the coated particles, washing said filtered particles, and subsequently drying the washed particles.

6. The preparation of an improved luminescent material which comprises the steps of adding particles of a luminescent metallic sulphide to a warm dilute solution of potassium silicate, acidifying the solution with acetic acid, precipitating a thin coating of silica on the particles of said sulphide by rendering the solution alkaline with ammonia, filtering out the coated particles, washing said filtered particles, and subsequently drying the washed particles.

7. The preparation of an improved luminescent material which comprises the steps of adding particles of zinc sulphide to a warm dilute solution of potassium silicate, acidifying the solution with acetic acid, precipitating a thin coating of silica on the particles of said sulphide by rendering the solution alkaline with ammonia, filtering out the coated particles, washing said filtered particles, and subsequently drying the washed particles.

8. A luminescent material comprising a luminscent granular metallic sulphide having a layer of silica deposited upon the granular elements of said sulphide, the weight of silica being in the range of 2 to 10 per cent of the weight of the sulphide.

9. A luminescent material comprising finely divided particles of luminescent zinc sulphide, each of said particles being coated with a thin layer of silica, the weight of the silica being in the range of 2 to 10 per cent of the weight of the sulphide.

RONALD PULESTON.
STANLEY THOMAS HENDERSON.